United States Patent [19]

Uryu

[11] Patent Number: 5,053,807
[45] Date of Patent: Oct. 1, 1991

[54] METHOD OF PRODUCING COLOR IMAGE IN COLOR PHOTOGRAPHIC PRINT ENLARGER AND DEVICE THEREFOR

[75] Inventor: Takeshi Uryu, Kyoto, Japan

[73] Assignee: Dainippon Screen Mfg. Co. Ltd., Japan

[21] Appl. No.: 490,476

[22] Filed: Mar. 8, 1990

[30] Foreign Application Priority Data

Mar. 8, 1989 [JP] Japan .................................. 1-53761

[51] Int. Cl.⁵ .............................................. G03B 27/80
[52] U.S. Cl. ........................................ 355/38; 355/68; 355/77
[58] Field of Search ............................. 355/38, 68, 77; 356/404, 444; 358/76, 80

[56] References Cited

U.S. PATENT DOCUMENTS

| | | | |
|---|---|---|---|
| 4,101,216 | 7/1978 | Grossmann | 355/38 X |
| 4,565,441 | 1/1986 | Evans et al. | 355/69 X |
| 4,843,431 | 6/1989 | Horiguchi et al. | 355/38 X |

FOREIGN PATENT DOCUMENTS 59-71039 4/1984 Japan .
61-281231 12/1986 Japan .

Primary Examiner—L. T. Hix
Assistant Examiner—D. Rutledge
Attorney, Agent, or Firm—Ostrolenk, Faber, Gerb & Soffen

[57] ABSTRACT

A color image producing method for producing a color image of a desired original is based on the use of a reference original having a certain light transmitting characteristic. A tone of the original corresponding to the intensity of light with respect to each of three primary colors is obtained by transmitting a predetermined light intensity through the original. The method includes the steps of detecting a difference in tone between the reference original and the desired original with respect to each of the three primary colors of light, and offsetting the tone difference by employing two primary colors, other than the red primary color of light. Since the tone difference is offset by employing the two primary colors, there occurs no degradation in color reproduction of the original as in a case where a cyan filter is inserted between a light source and the original to offset the tone difference, in dependence on the amount of the cyan filter inserted.

20 Claims, 5 Drawing Sheets

METHOD OF PRODUCING COLOR IMAGE IN COLOR PHOTOGRAPHIC PRINT ENLARGER AND DEVICE THEREFOR

BACKGROUND OF THE INVENTION

1. Field of the Invention

The present invention relates generally to control of an exposure when a color original is reproduced on a photosensitive material by a color photographic print enlarger, and more particularly to method of and a device for reproducing a color image with suitable tones.

2. Description of the Related Art

A known method of reproducing a color image, in which an image on a color original is projected onto a photosensitive material such as color photographic printing paper or a color film by a photographic print enlarger to expose the photosensitive material, proceeds as follows.

Filters of three primary colors, of subtractive color mixture, type, i.e., cyan (C), magenta (M) and yellow (Y), are inserted in sequence into an optical path through which a color original is projected onto a photosensitive material, so that exposure by each colored light is sequentially carried out. Controlling the amount of each filter inserted into the optical path adjusts the density of each filter to a desired value, thereby controlling tones of a reproduced color image.

The "density" of a filter represents the capacity of the filter to absorb light. A value of density is obtained by taking the logarithm of the measured ratio of the amount of incident light on the filter to the amount of light transmitted through the filter, or the ratio of the amount of light transmitted through a reference filter to the amount of light transmitted through an object filter. The logarithm of the ratio is taken due to the characteristic logarithmic response of the human to light. That is, the eye recognizes an increase in the actual amount of light logarithmically.

A cyan filter absorbs red to different degrees. Therefore, controlling the density of the cyan filter makes it possible to adjust the amount of red included in the exposure light. If a cyan filter having a larger density value is inserted into the optical path, for example, a smaller amount of red is included in the transmitted light. If a cyan filter having a smaller density value is employed, a larger amount of red is included in the transmitted light.

A magenta filter selectively absorbs green. A yellow filter selectively absorbs blue. Therefore, adjusting the density of the magenta filter and that of the yellow filter enables adjusting the amount of green and blue in the transmitted light.

As is well known, red, green and blue are the three primary colors of additive color mixtures. Changing the proportion of these colors makes it possible to obtain different tones. Therefore, a color image which is well balanced in color is obtained by properly adjusting, i.e. balancing, the respective densities of the cyan, magenta and yellow filters.

(1) A device provided in a color photographic print enlarger for tone control is described below.

The color photographic print enlarger has the characteristics described below.

(i) In the photographic print enlarger, Y, M and C color filters are provided between a color original and a light source, such that each of which filters can be inserted by a required amount into the optical path. Insertion of each filter by a required amount into the optical path varies the tones of light directed to the color original.

(ii) A projection lens is provided between the color original and a photosensitive material.

(iii) A photosensor for measuring the amount of light transmitted through the projection lens is provided between the projection lens and the photosensitive material.

(iv) Filters of the three primary colors, red (R), green (G) and blue (B), are provided on a photosensitive surface of the photosensor, each of which filters can be exchangeably provided on the photosensor.

(2) A conventional method of tone control in the color photographic print enlarger is described below.

(i) An original intended to be a reference for tone control (hereinafter referred to as the "reference original") is provided on the photographic print enlarger. Respective densities $Dy_0$, $Dm_0$ and $Dc_0$ of the Y, M and C filters for reproducing the reference original with good tones are evaluated in advance.

(ii) The R filter is first provided on a photosensitive surface of a photosensor for measuring the amount of light, and a light source directs white light (light incorporating all visual wavelengths) to the R filter. The photosensor measures the amount of light transmitted through the reference original and the R filter. At this time, no Y, M and C filters are used on the side of the light source.

(iii) The amount of light transmitted through the other G and B filters are also measured, similarly to the R filter.

(iv) An original which is to be reproduced (hereinafter referred to as an "original to be processed" is substituted for the reference original to be provided onto the color photographic print enlarger.

(v) The amounts of light transmitted through each of the B, G and R filters are evaluated through the steps of (ii) and (iii).

(vi) The ratio of the amount of light of the respective colors B, G and R evaluated in the steps (ii) and (iii) to that evaluated in the step (v) is logarithmically converted. Respective values obtained by logarithmical conversion are added to $Dy_0$, $Dm_0$ and $Dc_0$ (densities of the respective filters of Y, M and C for suitably reproducing the reference original). Thus, respective densities $Dy_1$, $Dm_1$ and $Dc_1$ of the Y, M and C filters for reproducing the original to be processed with suitable tones are obtained. That is, the following expressions are given.

$$\left. \begin{aligned} Dy_1 &= Dy_0 + (B_1 - B_0) \\ Dm_1 &= Dm_0 + (G_1 - G_0) \\ Dc_1 &= Dc_0 + (R_1 - R_0) \end{aligned} \right\} \quad (1)$$

In the above expressions, $Dy_1$, $Dm_1$, $Dc_1$ represent respective filter densities to be set; $B_1$, $G_1$, $R_1$ represent the measured amount of light transmitted through the original to be processed, the amount of which is logarithmically converted; and $B_0$, $G_0$, $R_0$ represent the measured amount of light transmitted through the reference original, the amount of which is logarithmically converted.

(vii) The Y, M and C filters are inserted by desired amounts sequentially into the optical path so that effective filter densities may be $Dy_1$, $Dm_1$ and $Dc_1$ as evaluated in the step (vi), whereby exposure by each colored light is carried out.

The exposure carried out through the above described procedures makes it possible to reproduce on the photosensitive material an original to be processed with different tones from those of the reference original, as a color image with suitable tones.

As mentioned in the foregoing, conventionally, the Y, M and C filter densities are corrected by correction values obtained in the expressions (1), based on the amount of light transmitted through the reference original and that transmitted through the original to be processed. However, there is a problem that the tones of the color image reproduced as described above do not always meet certain preferences. Moreover, the reproduced color image loses so-called "depth".

This degradation in image quality is comparatively small and thus rarely becomes a problem in amateur photography. Therefore, in general, densities of the Y, M and C filters are corrected by employing the correction values obtained by the above expressions (1). When an original is required to be reproduced with a higher quality of image, however, the degradation in image quality needs be eliminated as much as possible. In reproduction of an original to be used as a document to be applied to art printing, for example, the degradation in image quality described above must be eliminated.

SUMMARY OF THE INVENTION

The present invention is directed to solve the above-described problems. It is one object of the present invention to provide a color image producing method and a device therefor capable of reproducing a color original with suitable tones.

It is another object of the present invention to provide a method of and a device for determining optimal density values of Y, M and C filters in order to reproduce a color original with suitable tones.

It is a further object of the present invention to provide a method of and a device for correcting optimal density values of Y, M and C filters in order to reproduce a color image with suitable tones.

It is still another object of the present invention to provide a method of and a device for determining optimal density values of Y, M and C filters and also correcting required exposure times in order to reproduce a color original with suitable tones.

It is a still further object of the present invention to provide a method of and a device for controlling exposure for reproducing a color image with suitable tones by a desired magnification factor.

It is a still further object of the present invention to provide a method of and a device for controlling exposure for reproducing a color image including color bias with suitable tones by a desired magnification factor.

A method in accordance with the present invention in values producing a color image of a desired original based on a reference original having a light transmitting property. Transmission of predetermined amount of light through the original makes it possible to obtain a tone of the original, corresponding to intensity of each of three primary colors of light. The color image producing method in accordance with the present invention includes a detection step comprising detecting a tone difference between the reference original and an original to be processed with respect to each of the three primary colors of light, and an offsetting step of offsetting the tone difference by employing two primary colors other than red out of the three primary colors of light.

According to a preferred embodiment of the present invention, the color image producing method includes the steps of holding an original at a predetermined position, projecting predetermined amounts of light from a predetermined direction to the held original, and imaging the predetermined light transmitted through the original onto a predetermined image forming plane, downstream in the direction of travel of the predetermined light with respect to the original.

According to a further preferred embodiment of the present invention, the detection step includes a light measuring step involving measuring the intensity of each of three primary colors included in the light transmitted through the original along an optical path of the predetermined light between the original and the image forming plane, out of the predetermined light to output a luminous intensity signal, and a difference signal outputting step comprising outputting a difference signal with respect to each of the three primary colors of light, between a first luminous intensity signal measured with respect to the reference original and a second luminous intensity signal measured with respect to the desired original.

The color image producing method in accordance with the present invention includes the foregoing steps. With respect to the reference original and desired original, tones are each detected as differences between any three primary colors of light, and the detected differences in tone are offset by employing two other than red primary colors of light. Thus, there is no degradation in color reproduction of a resultant color image as in the case of offsetting the tones by also employing red light. An image of the original is converged onto the predetermined image forming plane to be formed with color reproduction corresponding to color components included in the predetermined light. Thus, providing a photosensitive material or the like at this position makes it possible to obtain a color image with desired color reproduction. Further, by measuring the first luminous intensity signal with respect to the reference original to output the second luminous intensity signal with respect to the desired original, difference signals with respect to the respective three primary colors of light are obtained, so that differences in tone can be easily offset by employing the two primary colors other than red.

According to another aspect of the present invention, the color image producing device in accordance with the present invention is provided for producing a color image of a desired original based on a reference original having a light transmitting property. A tone of the original, corresponding to intensity of each of three primary colors of light is obtained by transmitting predetermined light through the original. The color image producing device in accordance with the present invention includes detecting means for detecting a tone difference between the reference original and an original to be processed with respect to each of the three primary colors of light, and offsetting means for offsetting the tone difference by employing two of the three primary colors of light, other than red.

The color image producing device in accordance with the present invention is thus structured, so that no red is employed out of the three primary colors of light when offsetting the tone difference between the reference original and desired original. Thus, a resultant color image has superior color reproduction compared to the conventional case of offsetting the tone difference by employing red.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Experience has shown that degradation of image quality caused by conventional method is caused by density variation in a cyan filter used for exposure. In a case of producing a color print, with a color negative as an original, for example, it is considered that the degradation in image quality is due to a difference between cyan photosensitive wavelengths such as of photographic printing paper and a spectral wavelength band of the cyan filter inserted into an optical path.

The present invention provides a method of and a device for adjusting color balance while keeping density of the cyan filter constant even when reproducing an original to be processed and also a reference original.

Figure 1:
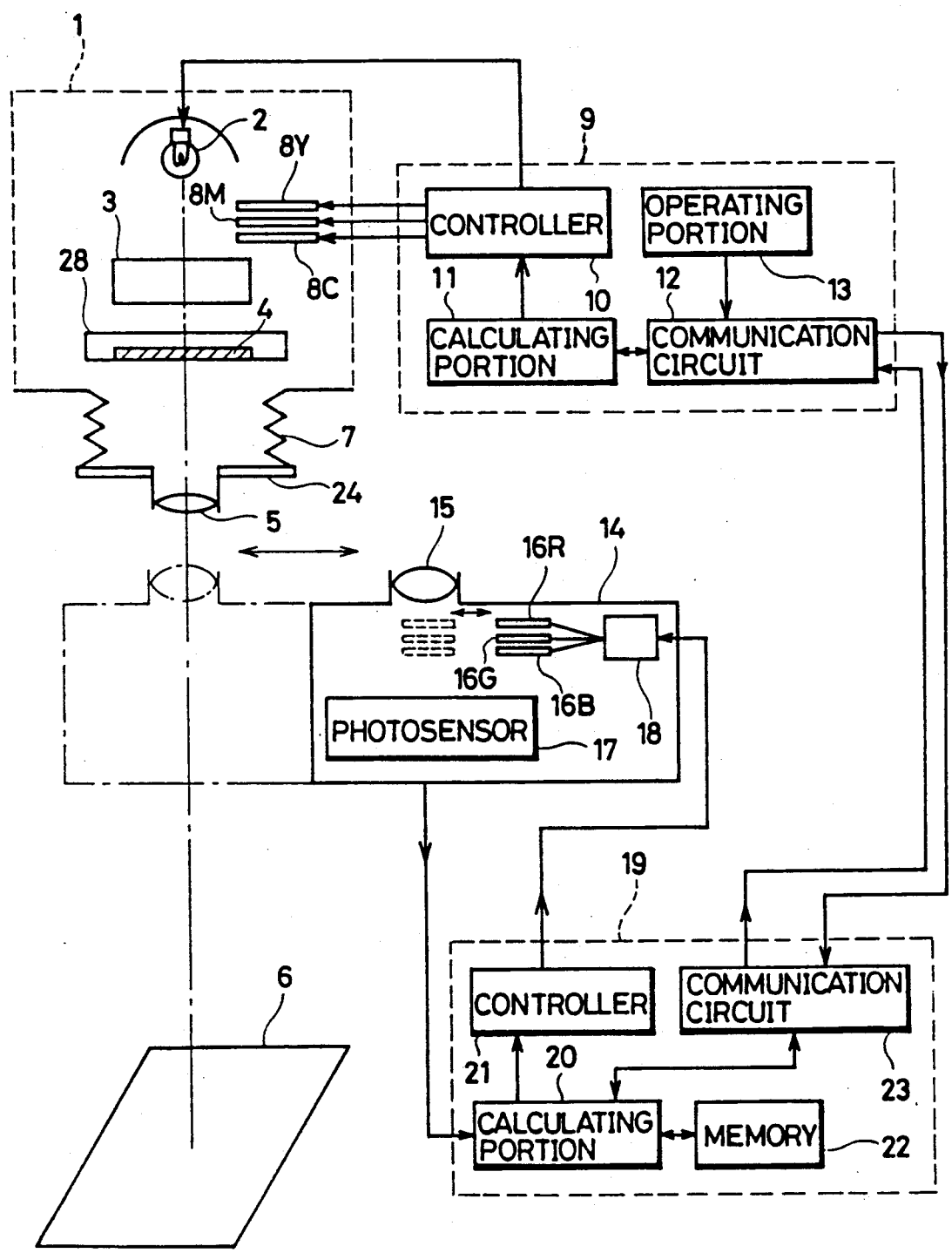
FIG. 1 is a block diagram of a color photographic print enlarger for practicing an exposure controlling method in accordance with the present invention.

FIG. 1 is a block diagram of a color photographic print enlarger for practicing the present invention.

Referring to FIG. 1, the color photographic print enlarger includes: an upwards and downwards movable exposing head 1 provided ascendably for projecting an image onto a horizontal image forming plane 6 while holding an original 4; a photometric device 14 which is provided at a predetermined position between the exposing head 1 and image forming plane 6 and is capable of being inserted into an optical path of light for exposure, for measuring each of color components B, G and R in the light for exposure and outputting an electrical signal representing the amount of light; a photometric device controlling unit 19 connected to the photometric device 14, for controlling the photometric device 14; and an exposure portion controlling unit 9 connected to the photometric device controlling unit 19, for evaluating a required amount of each of Y, M and C filters provided in the exposing head 1 to be inserted into an optical path, based on the amount of light measured by the photometric device 14, and inserting each filter into the optical path by the evaluated amount.

The exposing head 1 includes a light source 2, a yellow filter 8Y, a magenta filter 8M and a cyan filter 8C, which can be inserted independently by a desired amount into an optical path of light emitted from the light source 2, a diffusion box 3 provided in the optical path, for diffusing light transmitted through the filters 8Y, 8M and 8C and light which is not transmitted through the filters to produce a homogenous ray of light, an original holding device 28 for holding the original 4 between the diffusion box 3 and the image forming plane 6, and a projection lens 5 provided between the original 4 and image forming plane 6, for forming an image of the original 4 on the image forming plane 6. A plate 24 holding the projection lens 5 does not transmit light and is attached to the exposing head 1 by expandable bellows 7.

The photometric device 14 includes a condenser lens 15 provided on the top surface of the photometric device 14 so that an optical axis thereof is parallel to the optical path for exposure, a photosensor 17 of the type that senses three primary colors of light, i.e., R, G, B (Red-Green-Blue) provided immediately beneath the condenser lens 15, for outputting an electrical signal responsive to intensity of light transmitted through the condenser lens 15, filters 16B, 16G and 16R of three colors B, G and R, adapted to be inserted independently between the condenser lens 15 and the photosensor 17, and a filter driving device 18 for driving an arbitrary one of three filters 16B, 16G and 16R to insert or remove the driven filter between the condenser lens 15 and the photosensor 17. When the photometric device 14 is inserted into the optical path, the optical axis of the condenser lens 15 coincides with that of the projection lens 5.

The photometric device controlling unit 19 includes a calculating portion 20 connected to the photosensor 17, for processing measured data of each B, G and R color to obtain the amount of the Y, M and C filters 8Y, 8M and 8C inserted into the optical path, a memory 22 for storing measured data for the portion 20, a controller 21 connected to the portion 20, for controlling the filter driving device 18 to insert the filters 16B, 16G and 16R into the optical path, and a communication circuit 23 connected to the portion 20 and to the exposure portion controlling unit 9, for exchanging information between the portion 20 and the exposure portion controlling unit 9.

The exposure portion controlling unit 9 includes an operating portion 13 such as a keyboard, a communication circuit 12 connected to the operating portion 13 and to the communication circuit 23, for exchanging information between the communication circuits 12 and 23, a calculating portion 11 connected to the portion 20 via the communication circuits 12 and 23, for evaluating the amount of the filters 8Y, 8M and 8C to be inserted into the optical path and the amount of exposure by a predetermined operation in cooperation with the portion 20, and a controller 10 connected to the portion 11, for inserting a required amount of the filters 8Y, 8M and 8C into the optical path.

It is a characteristic of the above-described enlarger to use the following expressions (2) in place of the expressions (1) when the calculating portions 11 and 20 determine the amount of the filters 8Y, 8M and 8C to be inserted into the optical path.

$$\left.\begin{array}{l}Dy_1 = Dy_0 + (B_1 - B_0) - (R_1 - R_0) \\ Dm_1 = Dm_0 + (G_1 - G_0) - (R_1 - R_0) \\ Dc_1 = Dc_0\end{array}\right\} \quad (2)$$

According to the above expressions (2), a value of filter density for cyan (Dc) is maintained equal for both a reference original and an original to be processed. In order to correct color imbalance due to omission of the correction of the filter for cyan, a value corresponding to a correction value of the omitted cyan filter density is subtracted from yellow and magenta filter densities Dy and Dm. This makes it possible to determine the densities of the three color filters for reproducing the original to be processed with suitable tones without changing the cyan filter density.

Figure 2:
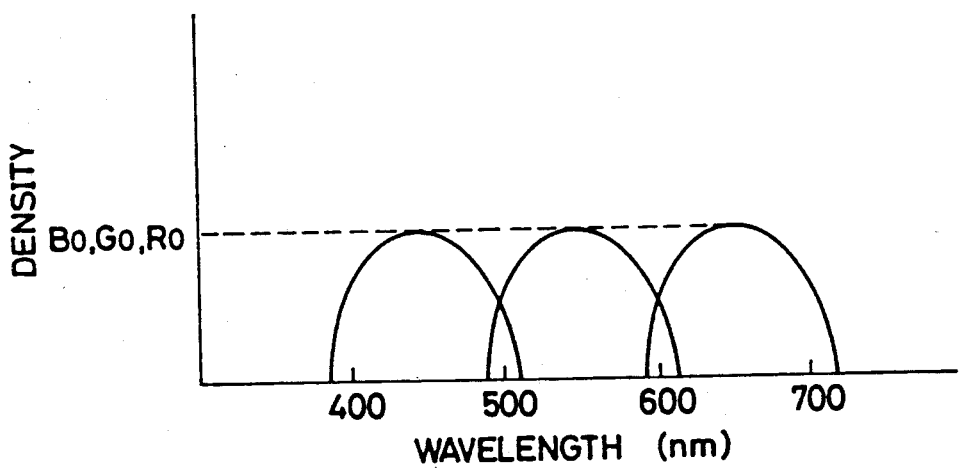
FIG. 2 is a slot of wavelength versus density of a color-balanced state.

A method of correcting filter density in accordance with the present invention will now be described in comparison with the conventional method with reference to FIGS. 2 to 4. Referring to FIG. 2, it is assumed that transmitted through blue (a wavelength 350 nm–520 nm), green (a wavelength 520 nm–600 nm) and red (a wavelength 600 nm–680 nm) filters out of white light, in suitably reproducing the reference original, are $B_0$, $G_0$ and $R_0$, respectively. FIG. 2 shows such the case where $B_0$, $G_0$ and $R_0$ are all equal, for facilitating the description.

Figure 3:
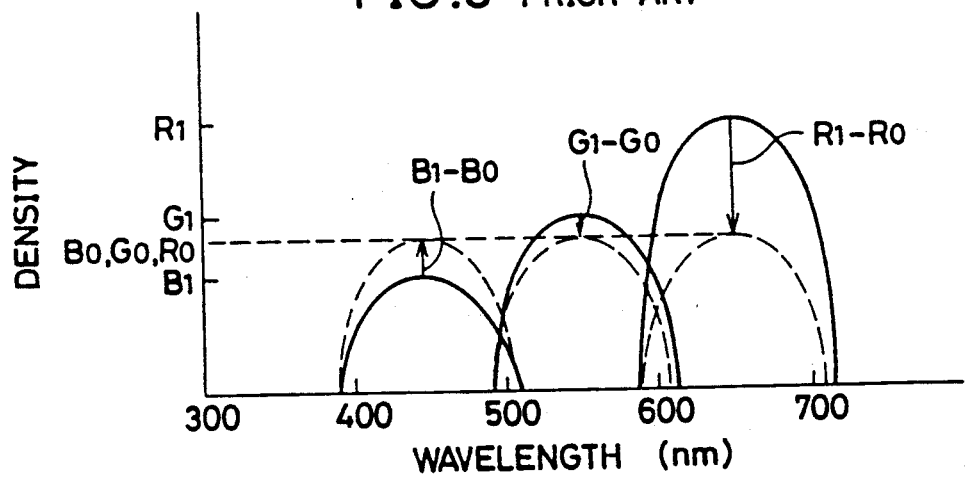
FIG. 3 is a wavelength versus density plot of a conventional tone controlling method.

Referring to FIG. 3, it is assumed that converted density values of the amount of light transmitted through the respective B, G and R filters in reproducing the original to be processed in place of the reference original are represented by $B_1$, $G_1$ and $R_1$, respectively.

Conventionally, the amounts of light transmitted through the B, G and R filters are adjusted to $B_0$, $G_0$ and $R_0$, respectively, by adjusting the respective densities of the Y, M and C filters. That is, in case where $R_1 > R_0$ is given as shown in FIG. 3, the density of the C filter is increased by $R_1 - R_0$, whereby the amount of light transmitted through the R filter is reduced by $R_1 - R_0$ to $R_0$ when converted into density. Similarly, values of $(B_1 - B_0)$ and $(G_1 - G_0)$ are added to the densities of the Y and M filters, respectively. Consequently, the amounts of light transmitted through the B, G and R filters become $B_0$, $G_0$ and $R_0$, respectively, when converted into density, resulting in the same color balance as that obtained in suitable reproduction of the reference original.

In this case, however, since the density of the C filter varies as described above, a resultant reproduced image has a slight disadvantage in color reproduction.

Figure 4:
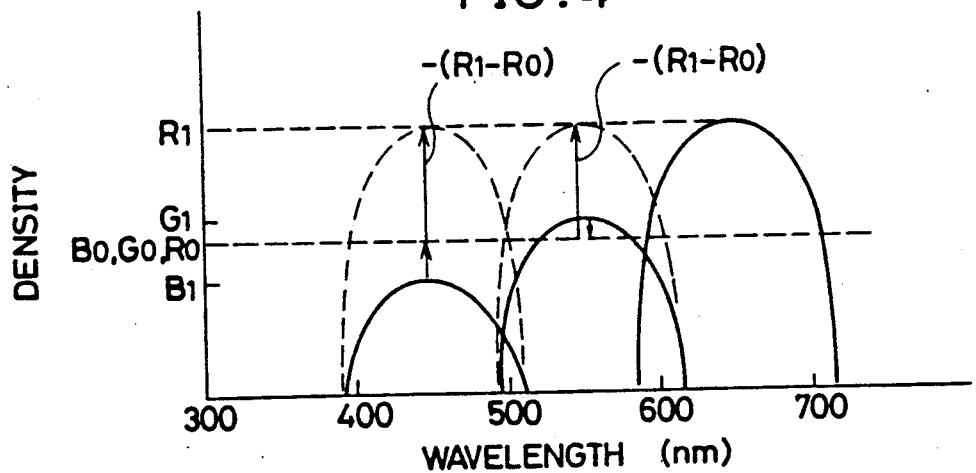
FIG. 4 is a wavelength versus density plot of a tone controlling method in accordance with the present invention.

Conversely, by the exposure controlling method of the present invention, the density of the C filter is kept constant, with reference to FIG. 4. The densities of the Y and M filters are first corrected to $B_0$ and $G_0$, respectively, and $-(R_1 - R_0)$ is then added to each of $B_0$ and $G_0$. Accordingly, the amount of light transmitted through the B filter and that through the G filter, when converted into density, uniformly become $R_1$, whereby good balance of R, G and B is obtained.

It should be noted that the case where $B_0$, $G_0$ and $R_0$ are equal is described as an example in the foregoing. Therefore, the amounts of light transmitted through the respective filters R, G and B, which are to be obtained finally, are all adjusted to $R_1$ when converted into density, in FIG. 4. It is rare, however, that the above-described condition applies in practice. Therefore, the amounts of light transmitted through the R, G and B filters, when converted into density, are in general not equal. Even in such a case, however, exposure is carried out with suitable color balance as far as the densities of the Y, M and C filters are corrected in accordance with the expressions (2).

Procedures for practicing the present invention by employing the above-described color photographic print enlarger are presented as follows.

A reference original is set at a position of the original 4 in the exposing head 1. The amount of the color filters 8Y, 8M and 8C at the light source side to be inserted into the optical path is set under condition where a reproduced color image with suitable tones is obtained, based on the experience or the result of test exposures.

The photometric device 14 is shifted to a position for measuring light, i.e., where the optical axis of the condenser lens 15 and that of the projection lens 5 are made coincident. The filter driving device 18 sequentially drives the three color filters 16B, 16G and 16R between the condenser lens 15 and the photosensor 17. The light source 2 projects white light having an intensity required for suitably reproducing the reference original. All the filters 8Y, 8M and 8C are disposed outside the optical path.

The white light is transmitted through the reference original 4 and then projected onto the image forming plane 6 by the projection lens 5. Since the condenser lens 15 is placed along the optical path, the projected light is transmitted through the condenser lens 15 and through any one of the filters 16B, 16G and 16R, which is then inserted into the optical path, and so reaches the photosensor 17.

The photosensor 17 measures the amount of incident light and outputs an electrical signal responsive to the amount of the light. The condenser lens 15 is provided at a position opposed to and immediately beneath the projection lens 5. The condenser lens 15 converges all of luminous flux out of the projection lens 5 on the photosensor 17. Therefore, the transmitted light from the overall surface of the reference original 4 becomes incident on the photosensor 17. The photosensor 17 outputs a signal corresponding to an average tone of the overall surface of the original 4.

The foregoing measured values form signals representing the amount of separated color of B, G, R with respect to a total tone of the reference original. The signals are transmitted to the calculating portion 20 to be logarithmically converted. The logarithmically converted measured values of B, G, and R are B0, G0 and R0 described above, respectively, and these values are stored in the memory 22.

Next, the reference original 4 is replaced by an original to be processed. The amounts of separated colors B, G, R are measured as in the case of the reference original. The respective measured values are $B_1$, $G_1$ and $R_1$ and these values are similarly stored in the memory 22.

The following values are already known: $B_0$, $G_0$, $R_0$, $B_1$, $G_1$, $R_1$, the respective densities $Dy_0$, $Dm_0$, $Dc_0$ of the Y, M and C filters 8Y, 8M, 8C in suitable reproduction of the reference original. Therefore, according to the expressions (2), it is possible to evaluate respective densities $Dy_1$, $Dm_1$ and $Dc_1$ of the Y, M and C filters 8Y, 8M and 8C for reproducing the original to be processed with suitable tones.

The calculating portion 20 transmits each measured data to the memory 22, stores the same in the memory 22, and also carries out a required calculation in accordance with the expressions (2) via the communication circuit 23 in cooperation with the calculating portion 11 in the exposure portion controlling unit 9. The portion 20 further controls the amount of the three kinds of color filters 8Y, 8M and 8C in the exposing head 1 to be inserted into the optical path so as to obtain desired effective filter densities.

In this case, the respective color filter densities are varied by $(R_1 - R_0)$ from the values obtained by the expressions (1). Thus, it becomes necessary to adjust the exposure time in order to obtain a suitable result of reproduction. That is, in case of $R_1 > R_0$, the color filter densities evaluated by the expressions (2) become lower than those evaluated by the expressions (1). Therefore, if exposure is carried out for the same period of time, over-exposure results. Conversely, in a case of $R_1 < R_0$, under-exposure occurs. It is thus necessary to acquire an appropriate exposure by correcting the exposure time.

The exposure time is corrected as follows. Assuming that the exposure time of the reference original is represented by $T_0$, and that of the original to be processed is $T_1$, the relationship of $T_0$, $T_1$, $R_0$ and $R$ is given by the following expression (3a):

$$T_1 : T_0 = 10^{R_0} : 10^{R_1} \tag{3a}$$

The above expression (3a) is given for the following reason. Exposure is determined by the product of the exposure time and the luminous intensity. If the photosensitive material is constant, the appropriate exposure is constant. That is, the following expression (3b) is given:

$$T \cdot I = constant \tag{3b}$$

where T represents exposure time, and I represents luminous intensity. When the R filter is employed, the luminous the intensity can be represented by intensity of the R components. As described above, logarithmizations of the luminous intensity of R components are $R_0$ and $R_1$. Assuming that intensity of transmitted light is $I_0$ in a suitable exposure of the reference original, and that the intensity in suitable exposure of the original to be processed is $I_1$, the following relationship is given:

$$R_0 = log I_0$$

$$R_1 = log I_1$$

Therefore, $$I_0 = 10^{R_0}$$

$$I_1 = 10^{R_1}$$

Consequently, the following expression (3c) is given by the above expression (3b).

$$T_0 \cdot 10^{R_0} = T_1 \cdot 10^{R_1} \tag{3c}$$

The expression (3a) is derived from the expression (3c).

From the expression (3a), the exposure time $T_1$ for suitably exposing the original to be processed is evaluated by the following expression (3).

$$T_1 = T_0 \times 10^{R_0 - R_1} \tag{3}$$

That is, a first value is obtained by inverting the sign of the omitted correction value for the C filter density.

A value, in which 10 is the base and the first value is the exponent, is evaluated to be a second value. Multiplying the time $T_0$ for suitably exposing the reference original by the second value results in an appropriate exposure time $T_1$ for the original to be processed.

Furthermore, the photographic print enlarger is sometimes employed for recording a reproduced image of arbitrary dimension, namely, for exposing the image with an altered magnification factor. Also in this case, it is necessary to set the adjusted exposure time depending on the magnification factor in order to obtain a suitable reproduction. It is possible to evaluate a suitable exposure time with the magnification factor altered as follows.

It is assumed that a reference magnification factor is $M_0$; the altered magnification factor is $M_1$; color filter density upon exposure by the reference magnification factor is $D_0$; color filter density upon exposure by the altered magnification factor is $D_1$; and a focal length of the projection lens 5 is f.

Figure 5:
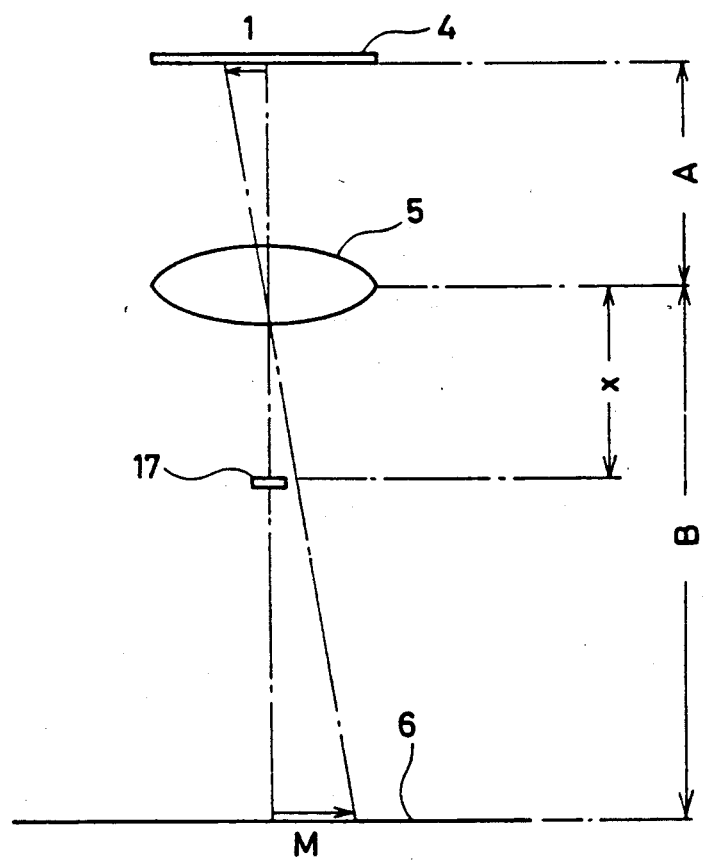
FIG. 5 is a schematic view of an optical system showing the principle of enlargement in a color photographic print enlarger.

Referring to FIG. 5, assuming that a distance from the lens to the photosensor 17 is x, x is not varied throughout exposures by different magnification factors. What is altered is a distance A from the original 4 to the projection lens 5. It is assumed that the original 4 of a size 1 is projected onto the image forming plane 6 positioned a distance B apart from the projection lens 5 as an image of a size M, i.e., a magnification factor M. The following expressions are given.

$$M = B/A \tag{4}$$

$$\frac{1}{A} + \frac{1}{B} = \frac{1}{f} \tag{5}$$

The below expressions (4) and (5) yield the expression (6).

$$A = \frac{1 + M}{M} f \tag{6}$$

Brightness of an image on the photosensor 17 is proportional to square root of the distance A between the original 4 and the projection lens 5. Assuming that the distance A is equal to $A_0$ when the magnification factor is $M_0$, while the distance A is equal to $A_1$ when the magnification factor is $M_1$, the following expression (7) is given.

$$D_0 : D_1 = \sqrt{A_1} : \sqrt{A_0} \tag{7}$$

Therefore, the expressions (8) and (9) shown below are obtained.

$$D_0^2 : D_1^2 = A_1 : A_0 \tag{8}$$

$$= \frac{1 + M_1}{M_1} f : \frac{1 + M_0}{M_0} f$$

$$D_0 = D_1 \sqrt{\frac{M_0(1 + M_1)}{M_1(1 + M_0)}} \tag{9}$$

In the expression (9), if the color filter densities $D_0$ and $D_1$ are replaced by measured densities $R_1$ and $R'_1$, respectively, the following expression (10) is given.

$$R_1 = R'_1 \sqrt{\frac{M_0(1 + M_1)}{M_1(1 + M_0)}} \tag{10}$$

It is known that when the magnification factor is altered from $M_0$ to $M_1$, the appropriate exposure time $T_1$ is evaluated by $$T_1 = \left(\frac{1 + M_1}{1 + M_0}\right)^2 \times T_0 \tag{11}$$

where, $T_0$ represents an appropriate exposure time by the reference magnification factor $M_0$.

The expression (12) shown below is obtained by substituting $T_1$ evaluated by the expression (3) for $T_0$ in the expression (11).

$$T_1 = \left(\frac{1 + M_1}{1 + M_0}\right)^2 \times T_0 \times 10^{(R_0 - R_1)} \tag{12}$$

Further, the expression (13) shown below is obtained by substituting $R_0$ evaluated by the expression (10) for $R_1$ in the expression (12).

$$T_1 = \left(\frac{1 + M_1}{1 + M_0}\right)^2 \times T_0 \times 10^{(R_0 - R'_1 \sqrt{\frac{M_0(1 + M_1)}{M_1(1 + M_0)}})} \tag{13}$$

To sum up the foregoing relationships, the following relationship is given. Assuming that the respective measured values when the original to be processed is projected by a desired magnification factor $M_1$ are $B_1$, $G_1$ and $R_1$, the respective color filter densities ($Dy_1$, $Dm_1$, $Dc_1$) to be set and the appropriate exposure time $T_1$ are obtained based on the following expressions (14).

$$\begin{aligned} Dy_1 &= Dy_0 + (B_1 - B_0) - (R_1 - R_0) \\ Dm_1 &= Dm_0 + (G_1 - G_0) - (R_1 - R_0) \\ Dc_1 &= Dc_0 \\ T_1 &= \left(\frac{1 + M_1}{1 + M_0}\right)^2 \times T_0 \times 10^{(R_0 - R_1 \sqrt{\frac{M_0(1 + M_1)}{M_1(1 + M_0)}})} \end{aligned} \tag{14}$$

Here, $B_0$, $G_0$ and $R_0$ represent the measured values of B, G and R, respectively, when the reference original is projected by the reference magnification factor $M_0$; $T_0$ is a suitable exposure time at that time; and $Dy_0$, $Dm_0$ and $Dc_0$ are densities of the respective filters.

Both calculating portions 11 and 20 shown in FIG. 1 are preset to perform an operational program based on the above-described expressions. The operation is performed according to the expressions (14) based on the measured values with respect to the reference original and original to be processed, stored in the memory 22. In accordance with the result of the operation, the amount of three color filters 8Y, 8M and 8C in the exposing head 1 which need to be inserted into the optical path and the exposure time are set. Sequentially performing projection exposure with the filter densities determined by the amount of the filters 8Y, 8M and 8C inserted makes it possible to accurately and easily set appropriate exposure conditions, both when the tone of the original to be processed ifferent from that of the reference original and when the original to be processed is projection-exposed by arbitrary magnification factor.

The foregoing first embodiment shows a fundamental method of obtaining suitable color balance while keeping the density of the C filter constant.

When the original to be processed has color bias, however, it is sometimes impossible to carry out a suitable correction by the above method. A photograph of a person in red cloths is one example thereof. In this case, an area occupied by red on the original is too large to carry out a suitable correction. That is, if the method of the first embodiment is practiced as is, the image is overly corrected, so that the red clothes are sometimes reproduced in gray. In such a case, the amount of correction should be reduced toward zero in order to obtain an appropriate tone. It is difficult, however, to further adjust the correction value appropriately according to expressions (14) manually.

An exposure controlling method of a second preferred embodiment of the present invention addresses this difficulty.

Figure 6:
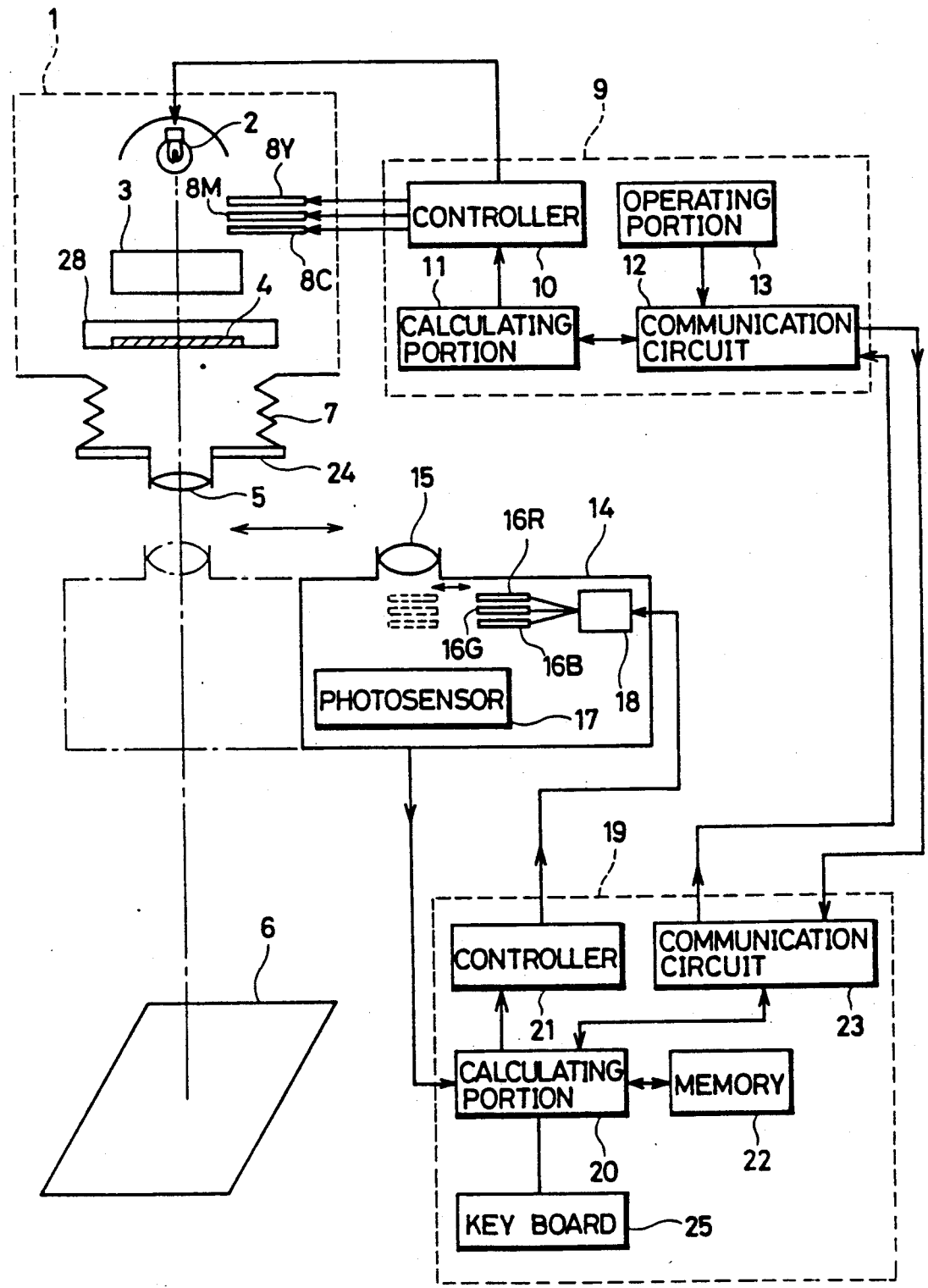
FIG. 6 is a block diagram of a color photographic print enlarger for practicing an exposure controlling method of a second preferred embodiment of the present invention.

Referring to FIG. 6, a color photographic print enlarger is shown which is different from the device in FIG. 1 in that the photometric device controlling unit 19 also includes a keyboard 25 connected to the calculating portion 20, for making it possible to display the color bias of the original to be processed and make it easily understandable even for beginners and to facilitate correction of the color bias. With the provision of the keyboard 25, programs in the portions 11 and 20 are slightly altered. In the device shown in FIG. 6, the same parts as those in the device shown in FIG. 1 are denoted with the same reference numerals and symbols and are referred to by the same names. Functions of those parts are also the same. Therefore, detailed descriptions thereof is not repeated.

Figure 7:
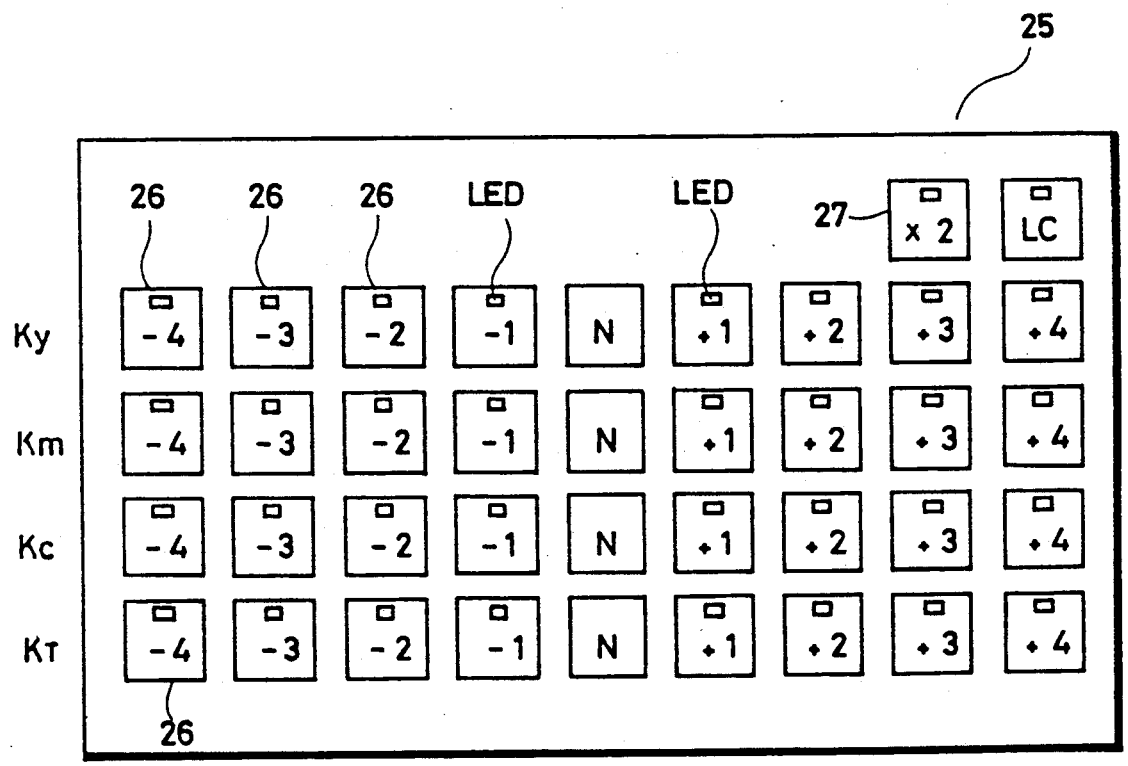
FIG. 7 is a plan view of a keyboard shown in FIG. 6.

Referring to FIG. 7, the keyboard 25 includes 36 filter density adjusting keys 26 arranged in 4 rows×9 columns, a density adjusting key LC for correcting percentage of the variable amount of density for color correction, and a key (hereinafter referred to as a "double key") 27 for switching unit filter density D, which will be described later, between a reference value and a doubled value thereof while displaying the density. An LED is provided on each of the keys.

The filter density adjusting keys 26 on the first row (the top row) serve to correct the density of the Y filter; those on the second row serve to correct the density of the M filter; and those on the third row serve to correct the density of the C filter. The filter density adjusting keys 26 on the bottom row serve to adjust the amount of white light for exposure and substantially adjust the exposure time. Numerals "−4" to "+4" provided on the top surfaces of the keys 26 represent the corrected amount during correction. The symbol "N" represents a neutral state, i.e., a noncorrection state.

Exposing procedures to be carried out in this device are as follows. First, similarly to the first preferred embodiment, the reference original is disposed in the exposing head 1 to measure the amount of separated color $B_0$, $G_0$ and $R_0$ by employing the filters 16B, 16G and 16R. The amounts $B_0$, $G_0$ and $R_0$ are stored in the memory 22.

Next, the amounts of separated colors $B_1$, $G_1$ and $R_1$ of light transmitted through the original to be processed in place of the reference original are measured to be stored in the memory 22, similarly to $B_0$, $G_0$ and $R_0$ The portion 20 evaluates density differences Ky, Km and Kc in the respective color components between the original to be processed and reference original by the following expressions (15).

$$Ky = (B_1 - B_0) - (R_1 - R_0)$$
$$Km = (G_1 - G_0) - (R_1 - R_0) \quad (15)$$
$$Kc = 0$$

Furthermore, a factor (hereinafter referred to as "white light bias density") $K_T$ for adjusting the exposure time is evaluated by the following expression (16).

$$K_T = R_1 - R_0 \quad (16)$$

It is possible to easily understand what is meant by the above expressions (15) and (16) from the expressions (2) and (3) of the first preferred embodiment.

The operation portion 20 evaluates scaling numbers $Ky_1$, $Km_1$ and $Kc_1$ of bias for each color and white light bias density $K_{T1}$ by converting Ky, Km, Kc and $K_T$ by the following expression (17) where D represents constant for the conversion.

$$Ky_1 = Ky/D$$
$$Km_1 = Km/D$$
$$Kc_1 = 0 \quad (17)$$
$$K_{T1} = K_T/D$$

A left side of the expression (17) is an integral part obtained by rounding-off the answer of the right side. Appropriately selecting D enables the scaling numbers $Ky_1$, $Km_1$, $Kc_1$ and the density $K_{T1}$ to be within the range from $-4$ to $+4$.

Basically, if the scaling numbers $Ky_1$, $Km_1$ and $Kc_1$ and the density $K_{T1}$ are displayed on the keyboard 25, it is possible for the operator to know color bias. In addition, if necessary as described above, the density differences Ky, Km and Kc and the white light bias density $K_T$ can be altered by further altering the correction values by employing the keys 26 on the keyboard 25. Therefore, reproduction can be carried out in a more appropriate state even with respect to the original to be processed having color bias.

According to the exposure controlling method of the present invention, however, the density of the C filter is kept constant as described above. The densities of the Y and M filters and exposure time are varied by the expressions (14) in order to gain color balance. Thus, it is difficult to intuitively recognize values to which the densities and exposure time are to be set in order to gain a desired color balance when correcting the correction values by the key board 25.

Therefore, the following method is adopted so that even beginners can easily alter the correction values, by using the presently described embodiment. First, the correction values obtained based on the measured values are converted by the expressions (18) appearing. Resultant converted values $Ky_3$, $Km_3$, $Kc_3$ and $K_{T3}$ are obtained and then displayed by the LEDs on the keys 26.

$$Ky_3 = Ky_1 + Kc_2$$
$$Km_3 = Km_1 + Kc_2 \quad (18)$$
$$Kc_3 = Kc_2$$
$$K_{T3} = K_{T1}$$

where, $Kc_2$ is a number determined dependenting on $Ky_1$ and $Km_1$.

In case of $Ky_1 > Km_1$, $Kc_2$ is determined to be $-Km_1$. Conversely, in case of $Ky_1 < Km_1$, $Kc_2$ is determined to be $-Ky_1$. Thus, $Km_3$ is 0 when the value of $Km_1$ is lower than $Ky_1$, while $Ky_3$ is 0 when $Km_1$ is higher than $Ky_1$.

Namely, $Ky_1$ or $Km_1$, which has a lower value than the other, is set as a reference. $Kc_2$ is then determined so that a converted reference value is 0. It is considered that $Kc_2$ is virtual bias of R components when either B or G is set as a reference.

Assuming that $Ky_1$, $Km_1$ are $+2$, $+3$, respectively, for example, the expression shown below is given.

$$Ky_3 = +2 - 2$$
$$= 0$$
$$Km_3 = +3 - 2$$
$$= +1$$
$$Kc_3 = Kc_2$$
$$= -2$$

Displaying $Ky_3$, $Km_3$ and $Kc_3$ on the key board 25 facilitates intuitive recognition of color bias.

The operator recognizes the color bias displayed on the key board 25 and confirms with a naked eye a color which occupies an especially large area of the original to be processed, thereby to correct each of filter density values by employing the keyboard 25. In the above-described case, for example, the respective correction values are altered to $Ky_3 = 0$, $Km_3 = 0$, $Kc_3 = -1$.

The portion 20 calculates again the filter densities based on the values set with the keyboard 25, in accordance with the following expressions (19).

$$Dy_2 = Dy_1 + K_B - K_R$$
$$Dm_2 = Dm_1 + K_G - K_R \quad (19)$$
$$Dc_2 = Dc_1$$
$$T_2 = T_1 \times 10^{K_T}$$

Here, $K_B = Ky_3 \times D$, $K_G = Km_3 \times D$, $K_R = Kc_3 \times D$, and $K_T = K_{T3} \times D$.

$Dy_1$, $Dm_1$, $Dc_1$ and $T_1$ are evaluated by the expressions (14). That is, these values represent densities of the respective filters after correction and the suitable exposure time in the first preferred embodiment of the present invention.

Filter densities $Dy_2$, $Dm_2$ and $Dc_2$ after correction and a suitable exposure time $T_2$ in the second preferred embodiment are evaluated according to the expressions (14) and (19) by the following expressions (20).

$$Dy_2 = Dy_0 + (B_1 - B_0 + K_B) - (R_1 - R_0 + K_R) \quad (20)$$
$$Dm_2 = Dm_0 + (G_1 - G_0 + K_G) - (R_1 - R_0 + K_R)$$
$$Dc_2 = Dc_0$$

$$T_2 = \left(\frac{1+M_1}{1+M_0}\right)^2 \times T_0 \times 10^{(R_0-R_1)\sqrt{\frac{M_0(1+M_1)}{M_1(1+M_0)}} + KT}$$

As shown in the above expressions (20), the density $Dc_2$ of the C filter is kept equal to the density $Dc_0$ of the C filter for appropriately exposing the reference original, in this embodiment as well. Therefore, the inconvenience that variation of the C filter density would cause image reproduction with undesired tones is avoided. In addition, it is possible even for the beginners to easily recognize color bias by employing the keyboard 25, in the second preferred embodiment. Thus, even when the original to be processed including color bias is reproduced, it is possible to easily and appropriately adjust the filter densities.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color image processing method for producing a color image of a color negative original based on a reference color negative original having a light transmitting property, wherein
  a tone of said color negative original, corresponding to the luminous intensity of each of the three primary red, green, and blue color components of light, is obtained by transmitting predetermined light through said color negative original, said method comprising the steps of:
  passing said predetermined light through and detecting a difference in said tone between said reference color negative original and said color negative original with respect to each of said red, green and blue components of light, said detecting step including:
    measuring a first luminous intensity of each of said red, green and blue color components of light transmitted through said color negative original and measuring a second luminous intensity of said red, green and blue color components of light transmitted through said reference color negative original when said original and reference color negatives are irradiated with said predetermined light; and
    obtaining for each said red, green and blue color components the difference between said first luminous intensity and said second luminous intensity; and
  offsetting said tone difference by adjusting a color balance of said predetermined light to obtain a respective final luminous intensity for each of the three red, green and blue color components of light such that the final luminous intensity of the red color component is not dependent on said difference between said first and second luminous intensities for red, the final luminous intensity of the green color component is dependent upon the difference in luminous intensity for green and the difference in luminous intensity for red, and the final luminous intensity for blue is dependent upon the difference in luminous intensity for blue and the difference in luminous intensity for red.

2. The color image producing method in accordance with claim 1, further comprising:
  holding said original at a predetermined position;
  projecting said predetermined light from a determined direction to said held original; and
  converging said predetermined light transmitted through said original onto a predetermined image forming plane to image said original thereon, at the opposite side to a direction along which said predetermined light travels with respect to said original.

3. The color image producing method in accordance with claim 2, wherein
  detecting step comprises:
  measuring, between said original and said image forming plane, the intensity of each of the three primary colors of light, included in the light transmitted through said original out of said predetermined light, to output luminous intensity signals; and
  outputting a difference signal with respect to each of the three primary colors of light, between a first of said luminous intensity signals measured with respect to said reference original and a second of said luminous intensity signals measured with respect to said desired original.

4. The color image producing method in accordance with claim 3, wherein
  said difference signal comprises
  a first difference signal of red components,
  a second different signal of green components, and
  a third difference signal of blue components.

5. The color image producing method in accordance with claim 4, wherein
  said offsetting step comprises:
  adjusting a color balance of said predetermined light after being transmitted through said reference original by subtracting from said predetermined light a predetermined first amount of red components, a predetermined second amount of green components and a predetermined third amount of blue components, in order to reproduce said reference original with predetermined color reproduction, for a predetermined exposure time and by a predetermined magnification factor;
  further adjusting the amount of green components included in said predetermined light in response to a difference between said first and second difference signals; and
  further adjusting the amount of blue components included in said predetermined light in response to a difference between said first and third difference signals.

6. The color image producing method in accordance with claim 5, further comprising:
  adjusting said predetermined exposure time, in response to said first difference signal, so as to compensate for a variation in the intensity of said predetermined light due to the adjustment of the green components in said green component adjusting step and the adjustment of the blue components in said blue component adjusting step.

7. The color image producing method in accordance with claim 6, further comprising:
  ..ering said predetermined magnification factor, a distance between said image forming plane and a light source of said predetermined light being varied by altering said magnification factor, the intensity of said predetermined light on said image forming plane being varied due to the variation of said distance; and adjusting said predetermined exposure time so as to compensate for the variation in the intensity of said predetermined light on said image forming plane.

8. The color image producing method in accordance with claim 7, wherein said green component adjusting step comprises inserting a light transmissive magenta filter into an optical path in response to the difference between said first and second difference signals.

9. The color image producing method in accordance with claim 8, wherein said blue component adjusting step comprises inserting a light-transmissive yellow filter into said optical path in response to the difference between said first and third difference signals.

10. The color image producing method in accordance with claim 9, wherein said color balance adjusting step comprises inserting into said optical path said cyan filter, said magenta filter and a yellow filter by amounts corresponding to said first amount of red components, said second amount of green components and said third amount of blue components, respectively.

11. A color image producing device for producing a color image of a color negative original based on a reference color negative original having a light transmitting property, wherein a tone of said color negative original, corresponding to the luminous intensity of each of the three primary red, green and blue color components of light, is obtained by transmitting predetermined light through said color negative original, said device comprising;

detecting means for detecting a tone difference in said tone between said reference color negative original and said color negative original with respect to each of said, red, green and blue components of light, said means for detecting including:

measuring means for measuring a first luminous intensity of each of said red, green and blue color components of light transmitted through said color negative original and measuring a second luminous intensity of said red, green and blue color components of light transmitted through said reference color negative original when said original and reference color negatives are irradiated with said predetermined light;

obtaining means for obtaining for each said red, green and blue color components a difference between said first luminous intensity and said second luminous intensity; and offsetting means for offsetting said tone difference by adjusting a color balance of said predetermined light to obtain a respective final luminous intensity for each of the three red, green and blue color components of light such that the final luminous intensity of the red color component is not dependent on said difference between said first and second luminous intensities for red, the final luminous intensity of the green color component is dependent upon the difference in luminous intensity for the green and the difference in luminous intensity for red, and the final luminous intensity for blue is dependent upon the difference in luminous intensity for blue and the difference in luminous intensity for red.

12. The color image producing device in accordance with claim 11, further comprising:

original holding means for holding said original at a predetermined position;

a light source for projecting said predetermined light from a predetermined direction to said held original along a predetermined optical path; and optic means provided at the opposite side to said light source with respect to said original, for converging said predetermined light transmitted through said original onto a predetermined image forming plane to image said original thereon.

13. The color image producing device in accordance with claim 12, wherein said detecting means comprises measuring means provided between said original and said image forming plane, for measuring intensity of each of the three primary colors of light, included in the light transmitted through said original out of said predetermined light to output luminous intensity signals, and difference signal outputting means for outputting a difference signal with respect to each of the three primary colors of light between a first of said luminous intensity signals measured with respect to said reference original and a second of said luminous intensity signals measured with respect to said desired original.

14. The color image producing device in accordance with claim 13, wherein said difference signal comprises a first difference signal of red components, a second difference signal of green components, and a third difference signal of blue components.

15. The color image producing device in accordance with claim 14, wherein offsetting means comprises color balance adjusting means for adjusting color balance of said predetermined light after being transmitted through said reference original by subtracting from said predetermined light a predetermined first amount of red components, a predetermined second amount of green components and a predetermined third amount of blue components in order to reproduce said reference original with predetermined color reproduction, for a predetermined exposure time and by a predetermined magnification factor, green component adjusting means for further adjusting the amount of green components included in said predetermined light in response to a difference between said first and second difference signals, and blue component adjusting means for further adjusting the amount of blue components included in said predetermined light in response to a difference between said first and third difference signals.

16. The color image producing device in accordance with claim 15, further comprising:

first exposure time adjusting means for adjusting said predetermined exposure time, in response to said first difference signal, so as to compensate for a variation in the intensity of said predetermined light due to the adjustment of the green components by said green component adjusting means and the adjustment of the blue components by said blue component adjusting means.

17. The color image producing device in accordance with claim 16, further comprising:
magnification factor altering means for altering said predetermined magnification factor,
a distance between said image forming plane and said light source being varied by altering said magnification factor,
the intensity of said predetermined light on said image forming plane being varied due to the variation of said distance; and
second exposure time adjusting means for adjusting said predetermined exposure time so as to compensate for the variation in the intensity of said predetermined light on said image forming plane.

18. The color image producing device in accordance with claim 17, wherein
said green component adjusting means comprises
a light-transmissive magenta filter capable of being inserted by desired amount into an optical path of said predetermined light, and
magenta filter inserting means for inserting said magenta filter into said optical path in response to the difference between said first and second difference signals.

19. The color image producing device in accordance with claim 18, wherein
said blue component adjusting means comprises
a light-transmissive yellow filter capable of being inserted by desired amount into said optical path of said predetermined light, and
yellow filter inserting means for inserting said yellow filter into said optical path in response to the difference between said first and third difference signals.

20. The color image producing device in accordance with claim 19, wherein
said color balance adjusting means comprises
a light-transmissive cyan filter capable of being inserted by desired amount into said optical path of said predetermined light, and
filter inserting means for inserting into said optical path said cyan filter, said magenta filter and said yellow filter by amounts corresponding to said first amount of red components, said second amount of green components and said third amount of blue components, respectively.

* * * * *